United States Patent [19]
Pedain et al.

[11] 4,296,230
[45] Oct. 20, 1981

[54] POLYURETHANE COATINGS PRODUCED FROM (1) A POLYISOCYANATE MIXTURE OF POLYISOCYANATES FROM THE DIPHENOL METHANE SERIES AND A POLYHYDROXY POLYETHER CONTAINING AT LEAST ONE TERTIARY AMINE NITROGEN WITH (2) A POLYOL IN A TWO COMPONENT COATING SYSTEM

[75] Inventors: Jøsef Pedain, Cologne; Walter Uerdingen, Bergisch-Gladbach; Hans-Jürgen Müller, Cologne, all of Fed. Rep. of Germany

[73] Assignee: Bayer Aktiengesellschaft, Leverkusen, Fed. Rep. of Germany

[21] Appl. No.: 938,165

[22] Filed: Aug. 30, 1978

Related U.S. Application Data

[63] Continuation of Ser. No. 747,568, Dec. 6, 1976, abandoned.

[30] Foreign Application Priority Data

Dec. 10, 1975 [DE] Fed. Rep. of Germany ....... 2555535

[51] Int. Cl.³ ............................................. C08G 18/76
[52] U.S. Cl. .................... 528/67; 427/385.5; 428/423.1
[58] Field of Search ...................... 528/67; 427/385.5; 428/423.1

[56] References Cited

U.S. PATENT DOCUMENTS 3,644,457 2/1972 König et al. ........................... 528/78
3,792,023 2/1974 Havenith et al. ...................... 528/78

FOREIGN PATENT DOCUMENTS 1218360 1/1971 United Kingdom .

Primary Examiner—Maurice J. Welsh
Attorney, Agent, or Firm—Gene Harsh; Lawrence S. Pope

[57] ABSTRACT

The present invention relates to a process for the production of coatings by coating substrates of any type with a coating composition of which the binder consists essentially of a mixture of:
(a) a polyisocyanate component and
(b) at least one organic polyhydroxyl compound, distinguished by the fact that the polyisocyanate component
  (a) is a reaction product obtained from:
    (i) a polyisocyanate mixture which, in addition to from about 20 to 80%, by weight, of 2,4'-diisocyanato diphenyl methane, contains a total of from about 80 to 20%, by weight, of 2,2'-diisocyanato diphenyl methane, 4,4'-diisocyanato diphenyl methane and, optionally, higher nuclear polyisocyanates of the diphenyl methane series and
    (ii) a polyhydroxy polyether containing at least one tertiary amine nitrogen atom and having an average molecular weight of from about 500 to 10,000 or a polyhydroxy polyether mixture containing at least one such polyhydroxy polyether and having an average molecular weight of from about 500 to 10,000.

components (i) and (ii) having been reacted in an NCO:OH equivalent ratio of from about 300:1 to 10:1 to form a reaction product containing free isocyanate groups and urethane groups.

15 Claims, No Drawings

POLYURETHANE COATINGS PRODUCED FROM (1) A POLYISOCYANATE MIXTURE OF POLYISOCYANATES FROM THE DIPHENOL METHANE SERIES AND A POLYHYDROXY POLYETHER CONTAINING AT LEAST ONE TERTIARY AMINE NITROGEN WITH (2) A POLYOL IN A TWO COMPONENT COATING SYSTEM

This is a continuation of application Ser. No. 747,568, filed Dec. 6, 1976, and now abandoned.

BACKGROUND OF THE INVENTION

Solvent-free and low-solvent two-component polyurethane lacquers have acquired increasing significance over recent years. Two-component lacquers based on 4,4'-diisocyanato diphenyl methane are ideally suitable for quick-hardening coatings on concrete, steel, highly stressed industrial floors, ships decks and fuel oil containers, and are being used to an ever increasing extent. Such lacquers have the considerable advantage that they harden extremely quickly and lead more quickly to the expected properties at room temperature than is possible with any other known 2-component polyurethane lacquer. They have the additional advantage of a relatively low vapor pressure.

Nevertheless, conventional products are also attended by considerable disadvantages:

4,4'-diphenyl methane diisocyanate may only be used as a starting product for polysolvent-free lacquers because the pure compound crystallizes at 37° C. and, when stored, dimerizes into a solid substance. The starting product used contains polyfunctional homologue mixtures having a functionality of greater than 2. Although its tendency towards crystallization is minimal, it is, on the other hand, very dark in color, with the result that it cannot be used for light-colored lacquers. In addition, the viscosity of this starting product is relatively high, which makes it difficult to process, for example, into solvent-free spray lacquers. Another disadvantage is that these starting polyisocyanates often show only limited compatibility with various reactants, such as hydroxy polyethers. When the components are mixed, hazy mixtures are initially formed and only become clear and homogeneous, if at all, after a certain preliminary reaction.

The pot-life of the mixture of the two components is also an important factor. The known two-component systems which are based on 4,4'-diphenyl methane diisocyanate and contain less than 20% of 2,4'-isomer have only a short pot-life and, hence, a limited processing time, with the result that it is only possible to make up relatively small batches (cf. Hans Wagner/Hans Friederich Sarx, Lackkunstharze, Carl Hanser Verlag, 5th Edition, Munich, 1971, inter alia pages 158 to 170; Hans Knittel, Lehrbuch der Lacke und Beschichtungen, Vol 1, part 2, Verlag W. A. Colomb in H. Hennemann GmbH, BerlinOberschwandorf, 1973, pages 586 eq seq).

Accordingly, there is a need for solvent-free and low-solvent polyurethane lacquers for quick-hardening coatings which show improved compatibility, lead to longer pot-lives, the polyisocyanate component of which does not have a high vapor pressure and does not show any tendency towards the development of deposits and crystallization, are light in color and have none of the above-mentioned disadvantages of conventional two-component polyurethane lacquers.

The present invention provides a new lacquer system which satisfies the above requirements. It has been found that two-component polyurethane lacquers having the requisite properties may be obtained by using as the polyisocyanate component certain reaction products defined hereinafter of certain selected polyisocyanates of the diphenyl methane series with certain selected polyhydroxy polyethers.

SUMMARY OF THE INVENTION

The present invention relates to a process for the production of coatings by coating substrates of any type with a coating composition of which the binder consists essentially of a mixture of:

(a) a polyisocyanate component and
(b) at least one organic polyhydroxyl compound, distinguished by the fact that the polyisocyanate component (a) is a reaction product obtained from:

(i) a polyisocyanate mixture which, in addition to from about 20 to 80%, by weight, of 2,4'-diisocyanato diphenyl methane, contains a total of from about 80 to 20%, by weight, of 2,2'-diisocyanato diphenyl methane, 4,4'-diisocyanato diphenyl methane and, optionally, higher nuclear polyisocyanates of the diphenyl methane series and (ii) a polyhydroxy polyether containing at least one tertiary amine nitrogen atom and having an average molecular weight of from about 500 to 10,000 or a polyhydroxy polyether mixture containing at least one such polyhydroxy polyether and having an average molecular weight of from about 500 to 10,000, components (i) and (ii) having been reacted in an NCO:OH equivalent ratio of from about 300:1 to 10:1 to form a reaction product containing free isocyanate groups and urethane groups.

DETAILED DESCRIPTION OF THE INVENTION

The coating compositions used in the process according to the present invention are preferably solvent-free or have a low solvent content, in other words they have a lacquer solvent content of from about 0 to 40%, by weight, based on solids. It is particularly preferred to use totally solvent-free coating compositions in the process according to the present invention. Although the isocyanate component used in the process according to the present invention is formed by a urethaneization reaction, it has a surprisingly low viscosity so that the coating compositions may be applied to the substrate to be coated by spraying. After processing, the coating compositions used in accordance with the present invention have an astonishingly short hardening time.

One commercially particularly important surprising property of the polyisocyanate components present in the coating compositions according to the present invention is their excellent compatibility with most of the polyhydroxyl compounds normally encountered in polyurethane lacquer technology. They are even able to impart compatibility between basically incompatible polyols.

The binders used in the process according to the present invention consist essentially of a polyisocyanate component (a) and a polyol component (b).

The polyisocyanate component (a) is a reaction product, containing from about 16 to 32%, by weight, of NCO-groups and from about 0.01 to 1.0%, by weight, of tertiary amine nitrogen atoms together with urethane groups, of a polyisocyanate mixture (i) with a polyhydroxy polyether or polyhydroxy mixture (ii) containing at least one tertiary amine nitrogen. The reaction of components (i) and (ii) is carried out in conventional manner at from about 0° to 100° C., preferably at from about 20° to 40° C., the reactants being present in quantities which correspond to an NCO:OH equivalent ratio of from about 300:1 to 10:1, preferably from about 100:1 to 10:1.

The polyisocyanate mixture (i) is a mixture of polyisocyanates of the diphenyl methane series with a 2,4'-diisocyanato diphenyl methane content of from about 20 to 80%, by weight, preferably from about 30 to 70%, by weight. 2,4'-diisocyanato diphenyl methane is formed as a secondary product in the phosgenation of aniline/formaldehyde condensates on a commercial scale and may readily be separated off from the phosgenation product by fractional distillation in admixture with 2,2'-diisocyanato diphenyl methane and 4,4'-diisocyanato diphenyl methane. Thus, it is readily possible to distill off from the phosgenation product of aniline/formaldehyde condensates a diisocyanato diphenyl methane isomer mixture which consists of from about 0 to 5 parts, by weight, of 2,2'-, from about 20 to 80 parts, by weight, preferably from about 30 to 70 parts, by weight, of 2,4'- and of from about 80 to 20 parts, by weight, preferably from about 70 to 30 parts, by weight, of 4,4'-diisocyanato diphenyl methane. A polyisocyanate mixture such as this represents a preferred polyisocyanate mixture (i).

However, suitable polyisocyanate mixtures (i) may also be directly obtained as the phosgenation product of aniline/formaldehyde condensates without any need for separation by distillation if provision is made in a known manner during the actual aniline-formaldehyde condensation process, in particular by means of the type and quantity of catalyst used and by means of the aniline/formaldehyde molar ratio, to ensure that the amine mixture to be phosgenated contains from about 20 to 80%, by weight, and preferably from about 30 to 70%, by weight, of 2,4'-diamino diphenyl methane.

Finally, a third exemplary method of obtaining polyisocyanate mixtures (i) suitable for use in accordance with the present invention comprises remixing the distillation fraction mentioned first of all, enriched with 2,4'-isomers, with polyisocyanate mixtures of the diphenyl methane series having a reduced 4,4'-diisocyanato diphenyl methane content, for example in accordance with DT-AS No. 1,923,214.

The polyisocyanate mixtures (i) obtainable by the last two methods described above are also suitable for producing the polyisocyanate component (a) used in the process according to the present invention and, in addition to the 2,4'-diisocyanato diphenyl methane content crucial to the present invention of from about 20 to 80%, by weight, preferably from about 30 to 70%, by weight, contain from about 0 to 5%, by weight, of 2,2'-diisocyanato diphenyl methane and from about 80 to 20%, by weight, preferably from about 70 to 30%, by weight, of 4,4'-diisocyanato diphenyl methane and polyisocyanates of the diphenyl methane series having a functionality of greater than 2, the content of the last two components being variable within wide limits.

Component (ii) consists of polyhydroxy polyethers or polyhydroxy polyether mixtures having a content of tertiary amine nitrogen atoms of from about 0.2 to 10.0%, by weight. The polyethers or polyether mixtures have an average molecular weight of from about 500 to 10,000, preferably from about 1500 to 6000, and an average OH-functionality of from about 1.8 to 6.0, preferably from about 2 to 4. The products in question are preferably the known alkoxylation products of amines or aminoalcohols with preferably at least two hydrogen atoms active in the context of the alkylene oxide addition reactions, such as ammonia, ethylene diamine, hexamethylene diamine, methyl amine, diaminodiphenyl methane, aniline, ethanolamine, diethanolamine, N-methyl diethanolamine, tetrahydroxy ethyl ethylene diamine and the like. To produce component (ii), these exemplified starter molecules are reacted in conventional manner with ethylene oxide and/or propylene oxide to form the polyhydroxy polyethers suitable for use in accordance with the present invention. The alkylene oxides may be used individually, in admixture or in any order. It is also possible to use as polyol component (ii) mixtures of the polyhydroxy polyethers obtainable in this way with nitrogen-free polyhydroxy polyethers and/or monohydric polyether alcohols, the only important requirement being to respect the above-mentioned requirements in regard to OH-functionality and nitrogen content of the mixtures. Suitable nitrogen-free polyhydroxy polyethers are, for example, the known propoxylation and/or ethoxylation products of water or low molecular weight polyols, such as ethylene glycol, propylene glycol, trimethylol propane or glycerol. Suitable monohydric polyether alcohols are, for example, the known alkoxylation products of starter molecules having a functionality of 1 in the context of the alkylene oxide addition reaction, such as N-methyl aniline, methanol, ethanol or cyclohexanol.

The polyol component (b) consists of any polyhydroxyl compounds of the type commonly encountered in polyurethane chemistry having molecular weights of from about 500 to about 10,000 preferably from about 1000 to about 6000 which contain from about 1 to 12%, by weight, of hydroxyl groups and which preferably have a viscosity of 25° C. of at most about 20,000 cP, such as described, for example, in "Kunststoff-Handbuch", Vol VII, Polyurethane, by Vieweg and Hochtlen, Carl Hanser Verlag, Munich, 1966 and in High Polymers, Vol XVI, "Polyurethanes, Chemistry and Technology," by Saunders & Frisch, Interscience Publishers, New York, London, Vol I, 1962, pages 32–42 and 44–54, and Vol II, 1964, pages 5–6 and 198–199. Examples are the known hydroxyl-group-containing polyethers, polyesters, polyacrylates or even castor oil or hydroxyl-group-containing alkyd resins, with which simple polyhydric alcohols having a molecular weight of from about 62 to about 200, such as ethylene glycol, tetramethylene glycol, trimethylol propane or glycerol, may also be mixed.

Suitable polyesters with hydroxyl groups include, e.g. reaction products of polyhydric, preferably dihydric alcohols with the optional inclusion of trihydric alcohols, with polybasic, preferably dibasic, carboxylic acids. Instead of free polycarboxylic acids, the corresponding polycarboxylic acid anhydrides or esters of lower alcohols or mixtures thereof may be used for producing the polyesters. The polycarboxylic acids may be aliphatic, cycloaliphatic, aromatic and/or heterocyclic and may be substituted, e.g. with halogen atoms, and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethylterephthalate and bis-glycol terephthalate. Suitable polyhydric alcohols include, e.g. ethylene glycol, propylene-1,2- and -1,3-glycol, butylene-1,4- and -2,3-glycol, hexane-1,6-diol, octane-1,8-diol, neopentylglycol-cyclohexanedimethanol (1,4-bis-hydroxymethylcyclohexane), 2-methyl-propane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethyleneglycol, tetraethyleneglycol, polyethyleneglycols, dipropylene glycol, polypropyleneglycols, dibutyleneglycol and polybutylene glycols. The polyesters may contain a proportion of carboxyl end-groups. Polyesters of lactones, such as ε-caprolactone, or hydroxycarboxylic acids, such as ω-hydroxy-caproic acid, may also be used.

Suitable polyethers with hydroxyl groups which may also be used according to the invention are known and may be obtained, e.g. by the polymerization of epoxides, such as ethylene oxide, propylene oxide, butylene oxide, tetrahydrofuran, styrene oxide or epichlorohydrin, either each on its own, e.g. in the presence of $BF_3$, or by an addition of these epoxides, optionally as mixtures of or successively, to starting components which contain reactive hydrogen atoms, such as alcohols or amines, e.g. water, ethylene glycol, propylene-1,3- or -1,2-glycol, 4,4'-dihydroxy-diphenylpropane or aniline.

Suitable polyacrylates with hydroxyl groups are known and may be obtained by the polymerization of monomers such as trimethylol propane monomethacrylate, 2-hydroxy ethyl acrylate and -methacrylate, 2-(or 3)-hydroxy propyl acrylate and -methacrylate and 4-hydroxy butyl acrylate and -methacrylate.

Components (a) and (b) are present in the binders used in accordance with the present invention in quantities which correspond to an NCO:OH equivalent ratio of from about 0.8:1 to 1.8:1, preferably from about 0.8:1 to 1.2:1.

The coating compositions used in the process according to the present invention may be prepared in any standard units and may be provided with the conventional auxiliaries and additives. It is, of course, also possible to add other lacquer-grade starting materials, such as unsaturated polyester resins and/or auxiliaries. For example, catalysts, such as amines or metal compounds, may be added to adjust reactivity, in addition to which it is possible to add cellulose esters, leveling agents, plasticizers, silicone oils or other conventional materials. A major advantage of the lacquers produced by the process according to the present invention is their low viscosity so that, as mentioned above, they may be processed in the absence of solvents. However, it is also possible, as already mentioned above, to use solvents, such as white spirit, xylene, toluene, ethyl acetate, ethyl glycol acetate, acetone and methyl isobutyl ketone.

The lacquers may be applied to the substrates to be coated by any of the conventional methods, such as spread coating, roll coating, spray coating, dip coating, casting etc. By virtue of their low viscosity, they may be applied particularly advantageously by spraying.

Conventional two-component airless spraying systems may be used for this purpose. The lacquers are particularly suitable for coating various substrates of wood, metal, concrete, plastics or other materials.

Two-component lacquers produced by the process according to the present invention are described in the following Examples. In some cases they are compared with conventional two-component lacquers. The following hydroxyl compounds are used as hydroxyl components:

EXAMPLES

Hydroxyl Compound (I)

Polyether of trimethylol propane and propylene oxide which contains 11.5% OH.

Hydroxyl Compound (II)

Polyethers of trimethylol propane, 1,2-propylene glycol, propylene oxide and 2% of ethylene oxide having an OH number of 42, an average molecular weight of 3700 and an average OH functionality of 2.78.

Polyhydroxyl Compound (III)

Polyester of adipic acid and diethylene glycol having an OH number of 42.

Polyhydroxyl Compound (IV)

Polyester of castor oil and a condensation product of cyclohexanone and formaldehyde having an OH content of 5%.

Hydroxyl Compound (V)

Castor oil (OH number 164)

Hydroxyl Compound (VI)

Polyether of ethylene diamine and propylene oxide having an average molecular weight of 3800, an OH functionality of 4, a hydroxyl number of 60 and an amine nitrogen content of 0.77%, by weight.

Hydroxyl Compound (VII)

Polyether of N-methyl diethanolamine and propylene oxide/ethylene oxide (molar ratio 10:1) having a hydroxyl number of 223 and an amine nitrogen content of 2.8%, by weight.

In the following Examples, the quantitative ratios between components (a) and (b) are always selected in such a way as to give an NCO:OH equivalent ratio of about 1:1. In cases where unmodified polyisocyanates are used (cf. Example 1(C)), the ratio of the isocyanate groups in the unmodified polyisocyanate to the hydroxyl groups in the polyhydroxyl compound used is also about 1:1.

EXAMPLE 1

This example describes the comparison of two elastic two-component lacquers produced by the process according to the present invention which are applied in a thick layer, with a lacquer that does not correspond to the present invention (polyisocyanate (C)).

Polyisocyanate components:

Polyisocyanate (A)

In a stirrer-equipped vessel, 200 parts of hydroxyl compound (VI) are added dropwise to 1000 parts of diphenyl methane diisocyanate, of which 2% consists of the 2,2'-isomer, 40% of the 2,4'-isomer and 58% of the 4,4'-isomer, followed by stirring for 3 hours at from 40° to 50° C. Thereafter, there is no further change in the NCO-content of the product. A pale yellow colored thinly liquid polyisocyanate having an NCO-content of 26.8% is obtained. It is stable at 0° C. and does not form a deposit.

Polyisocyanate (B)

200 parts of hydroxyl compound (VI) are added at from 20° to 30° C. to 1000 parts of diphenyl methane diisocyanate, of which 40% consists of the 4,4'-isomer and 60% of the 2,4'-isomer, followed by stirring until a constant NCO-content is obtained. The polyisocyanate (B) is obtained in the form of a substantially colorless thin liquid having an NCO-content of 26.6% which remains liquid below 0° C.

Polyisocyanate (C)

A conventional polyisocyanate having the following composition is used as comparison product: 39% of 4,4'-diphenylmethane diisocyanate, 3% of 2,2'-diphenyl methane diisocyanate, 18% of 2,4'-diphenyl methane diisocyanate and 39% of higher functional polyisocyanates of the diphenyl methane series. This starting product is liquid at low temperature and has an NCO-content of 31%. However, it is dark brown in color.

Lacquer Mixtures and Properties of the Lacquer Films

To produce clear lacquers, polyisocyanates (A), (B) and (C) are mixed with polyhydroxyl compound (I) and (IV) which are mixed with one another in a ratio, by weight, of 29:300. Using a lacquer "dumb-bell", the lacquers are applied to degreased steel plates in a layer thickness of 100μ. The properties are set out in the following table.

| Lacquer mixtures of polyhydroxyl compounds (I) and (IV) and polyisocyanates (A), (B) and (C). | | | |
| --- | --- | --- | --- |
| | Ratio, by weight, of (I):(IV):(A) = 29:300:193 | Ratio, by weight, of (I):(IV):(B) = 29:300:194 | Ratio, by weight, of (I):(IV):(C) = 29:300:167 |
| Appearance of the lacquer mixture | light, substantially colorless and clear | colorless, thinly liquid and clear | deep brown in color, thinly liquid, clouded |
| Standing time until gelation occurs | 200 minutes | 260 minutes | 110 minutes |
| Appearance of the lacquer film (approx 100μ) | colorless, transparent | colorless, transparent | brown, non-transparent, clouded |
| Sand drying (at 25° C.) after (DIN 53150 "Trocknungsgrad 1") | 4 hours 30 minutes | 5 hours | 4 hours |
| Pressure-resistant (after storage at 25° C.) (DIN 53150 "Trocknungsgrad 3") | 15 hours | 16 hours | 13 hours |
| Elasticity (when the plates are bent through 90°) | very good no cracks | very good no cracks | poor; lacquer film brittle, breaks and flakes |

It is clear from the Table that the lacquer which does not correspond to the present invention is unsuitable for lacquering metals. Although it dries slightly more quickly than the lacquers obtained by the process according to the present invention, it has a shorter processing time and inadequate mechanical properties. The lacquers produced by the process according to the present invention have considerable advantages in the sum total of their properties.

EXAMPLE 2

This Example describes another comparison test with Example 1. 1000 parts of polyisocyanate (C) from Example 1 are reacted with 200 parts of polyhydroxyl compound (VI) in the same way as described in Example 1, (A). A liquid polyisocyanate having an NCO-content of 26% is obtained and is also processed with the mixture of hydroxyl compounds (I) and (IV) to form a lacquer. The modification of polyisocyanate (C) with the basic polyether slightly improves the properties of the lacquer film in regard to elasticity. However, even this lacquer cannot be used because it is not possible to obtain compatibility, the lacquer is brown in color and clouded and its adhesion to steel plate is inadequate.

EXAMPLE 3

In comparison tests with Example 1, 1000 parts of diphenyl methane diisocyanate, of which 17% consists of the 2,4'-isomer, 2% of the 2,2'-isomer and 81% of the 4,4'-isomer, are reacted with 200 parts of polyhydroxyl compound (VI). Polyisocyanate (D), which is liquid under heat, begins to crystallize at +5° C. in a refrigerator. The entire mass hardens. On standing at room temperature, a mixture of liquid and solid fractions is formed which settles and cannot be re-liquified, even after prolonged storage at 25° C. Accordingly, polyisocyanate (D) is unsuitable for use in lacquers.

EXAMPLE 4

Polyisocyanate (B) of Example 1 is processed into a spray lacquer with hydroxyl compounds (II) and (III) which are mixed in a ratio of 9:1.

1000 parts of the mixture of the hydroxyl compounds are ground with 600 parts of heavy spar and thereafter homogeneously mixed with 118 parts of polyisocyanate (B) (Example 1). A lacquer mixture having a viscosity of about 2000 cP is obtained following the addition of 1 part of diazabicyclooctane as catalyst. Using an airless spraying system, it may be excellently sprayed to form hard, very elastic lacquers which are particularly suitable for coating ships' decks.

EXAMPLE 5

1000 parts of hydroxyl compound (VI) are ground with 100 parts of titanium dioxide pigments of the rutile type and 400 parts of heavy spar, and then mixed with 169 parts of polyisocyanate (B) from Example 1. The lacquer mixture is sprayed with an airless spraying system. Bubble-free, pure white highly elastic lacquer films are obtained on metal. The lacquer is particularly suitable for the solvent-free lacquering of metal appliances in which vertical surfaces have to be lacquered.

EXAMPLE 6

Starting from 1000 parts of a polyisocyanate, of which 63% consists of 2,4'-diphenyl methane diisocyanate, 3% 2,2'-diphenyl methane diisocyanate and 34% of 4,4'-diphenyl methane diisocyanate, and 100 parts of hydroxyl compound (VII) a polyisocyanate component (D) having an NCO-content of 28.9% is prepared by reaction for 30 minutes at 60° C.

To prepare a lacquer mixture, 200 parts of castor oil, into which 110 parts of titanium dioxide of the rutile type have been incorporated, are mixed with 89 parts of polyisocyanate component (D). A lacquer mixture is obtained which may be applied in the absence of solvents using an airless spraying system. It gives high-gloss, pure white lacquer films with very good elasticity, hardness and resistance to water and washing solutions.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of coatings by coating substrates of any type with a coating composition of which the binder consists essentially of a mixture of:
   (a) a polyisocyanate component and
   (b) at least one organic polyhydroxyl compound, wherein the polyisocyanate component (a) is a reaction product obtained from:
      (i) a polyisocyanate mixture which, in addition to from about 20 to 80%, by weight, of 2,4'-diisocyanato diphenyl methane, contains a total of from about 80 to 20%, by weight, of 2,2'-diisocyanato diphenyl methane, 4,4'-diisocyanato diphenyl methane, and optionally, higher nuclear polyisocyanates of the diphenyl methane series, and
      (ii) a polyhydroxy polyether containing at least one tertiary amine nitrogen atom and having an average molecular weight of from about 500 to 10,000 or a polyhydroxy polyether mixture containing at least one such polyhydroxy polyether and having an average molecular weight of from about 500 to 10,000, components (i) and (ii) having been reacted in an NCO:OH equivalent ratio of from about 300:1 to 10:1 to form a reaction product containing free isocyanate groups and urethane groups.

2. A process for the production of a coating comprising applying a two-component polyurethane lacquer composition to a substrate, said two-component polyurethane lacquer compositions containing a binder, said binder consisting essentially of:
   (a) a polyisocyanate component and
   (b) at least one organic polyhydroxyl compound, wherein said polyisocyanate component (a) is a reaction product containing free isocyanate groups and urethane groups comprising:
      (i) a polyisocyanate mixture comprising about 20 to 80% by weight, based on the polyisocyanate mixture, of 2,4'-diisocyanato diphenyl methane and about 80 to 20%, by weight, based on the polyisocyanate mixture, of 2,2'-diisocyanato diphenyl methane, 4,4'-diisocyanato diphenyl methane and the polyisocyanates of the diphenyl methane series having a functionality of greater than 2 and
      (ii) a polyhydroxy polyether containing at least one tertiary amine nitrogen atom and having an average molecular weight of from about 500 to 10,000.
wherein said components (i) and (ii) have been reacted in an NCO/OH equivalent ratio of from about 300:1 to 10:1.

3. The process of claim 2 wherein the two-component polyurethane lacquer composition is solvent-free.

4. The process of claim 2, wherein the two-component polyurethane lacquer composition has a solvent content of from about 0 to 40%, by weight, based on solids.

5. The process of claim 2 wherein the polyisocyanate component (a) contains from about 16 to 32%, by weight of NCO-groups and from about 0.1 to 1.0%, by weight, of tertiary amine nitrogen atoms.

6. The process of claim 2, wherein components (i) and (ii) have been reacted in an NCO/OH equivalent ratio of from about 100:1 to 10:1.

7. The process of claim 2 wherein the polyisocyanate mixture (i) comprises about 0 to 5% by weight of 2,2'-diisocyanato diphenyl methane, about 20 of 80% by weight of 2,4'-diisocyanato diphenyl methane and about 80 to 20% by weight of 4,4'-diisocyanato diphenyl methane.

8. The process of claim 7 wherein the polyisocyanate mixture (i) comprises about 0 to 5% by weight of 2,2'-diisocyanato diphenyl methane, about 30 to 70% by weight of 2,4'-diisocyanato diphenyl methane and about 70 to 30% by weight of 4,4'-diisocyanato diphenyl methane.

9. The process of claim 1 wherein component (ii) is a polyhydroxy polyether mixture containing at least one polyhydroxy polyether containing at least one tertiary amine nitrogen atom and wherein the mixture has an average molecular weight of from about 500 to 10,000.

10. The process of claim 2 wherein polyhydroxy polyether component (ii) has an average molecular weight of from about 1500 to 6000 and an average OH functionality of from about 1.8 to 6.0.

11. The process of claim 2 wherein polyhydroxyl component (b) contains from about 1 to 12% by weight of hydroxyl groups and has a viscosity of at most about 20,000 cP at 25° C.

12. The process of claim 2 wherein components (a) and (b) are present in an NCO/OH equivalent ratio of from about 0.8:1 to 1.8:1.

13. The two-component polyurethane lacquer composition coatings produced by the process of claim 2.

14. A polyurethane lacquer binder consisting essentially of
   (a) a polyisocyanate component and
   (b) at least one organic polyhydroxyl compound, wherein said polyisocyanate component (a) is a reaction product containing free isocyanate groups and urethane groups comprising:
      (i) a polyisocyanate mixture comprising about 20 to 80% by weight, based on the polyisocyanate mixture, of 2,4'-diisocyanato diphenyl methane and about 80 to 20% by weight, based on the polyisocyanate mixture of the compounds selected from the group consisting of 2,2'-diisocyanato diphenyl methane, 4,4'-diisocyanato diphenyl methane and polyisocyanates of the diphenyl methane series having a functionality of greater than 2 and
      (ii) a polyhydroxy polyether containing at least one tertiary amine nitrogen atom and having an average molecular weight of from about 500 to 10,000 or a polyhydroxy polyether mixture containing at least one such polyhydroxy polyether and having an average molecular weight of from about 500 to 10,000.
wherein said components (i) and (ii) have been reacted in an NCO/OH equivalent ratio of from about 300:1 to 10:1.

15. A polyisocyanate containing free isocyanate groups and urethane groups suitable for polyurethane lacquer binder formulations comprising the reaction product of:

(i) a polyisocyanate mixture comprising about 20 to 80% by weight, based on the polyisocyanate mixture, of 2,4'-diisocyanato diphenyl methane and about 80 to 20% by weight, based on the polyisocyanate mixture of the compounds selected from the group consisting of 2,2'-diisocyanato diphenyl methane, 4,4'-diisocyanato diphenyl methane and polyisocyanates of the diphenyl methane series having a functionality of greater than 2, and (ii) a polyhydroxy polyether containing at least one tertiary amine nitrogen atom and having an average molecular weight of from about 500 to 10,000 or a polyhydroxy polyether mixture containing at least one such polyhydroxy polyether and having an average molecular weight of from about 500 to 10,000, characterized in that said components (i) and (ii) have been reacted in an NCO/OH equivalent ratio of from about 300:1 to 10:1.

* * * * *